United States Patent [19]
Bahl et al.

[11] Patent Number: 5,884,259
[45] Date of Patent: Mar. 16, 1999

[54] METHOD AND APPARATUS FOR A TIME-SYNCHRONOUS TREE-BASED SEARCH STRATEGY

[75] Inventors: Lalit Rai Bahl, Amawalk; Ellen Marie Eide, Mount Kisco, both of N.Y.

[73] Assignee: International Business Machines Corporation, Armonk, N.Y.

[21] Appl. No.: 798,011

[22] Filed: Feb. 12, 1997

[51] Int. Cl.⁶ ..................................... G10L 9/06
[52] U.S. Cl. .................. 704/252; 704/242; 704/253; 704/256
[58] Field of Search .................. 704/231, 241, 704/253, 243, 240, 242, 252, 256

[56] References Cited

U.S. PATENT DOCUMENTS

| | | | |
|---|---|---|---|
| 4,400,788 | 8/1983 | Myers et al. | 704/241 |
| 4,713,778 | 12/1987 | Baker | 704/254 |
| 4,811,399 | 3/1989 | Landell et al. | 704/253 |
| 5,097,509 | 3/1992 | Lennig | 704/240 |
| 5,199,077 | 3/1993 | Wilcox et al. | 704/256 |
| 5,243,685 | 9/1993 | Laurent | 704/200 |
| 5,390,278 | 2/1995 | Gupta et al. | 704/243 |
| 5,488,652 | 1/1996 | Bielby et al. | 704/231 X |
| 5,515,475 | 5/1996 | Gupta et al. | 704/242 |
| 5,638,487 | 6/1997 | Chigier | 704/231 X |
| 5,649,051 | 7/1997 | Rothweiler et al. | 704/222 |
| 5,668,925 | 9/1997 | Rothweiler et al. | 704/220 |

*Primary Examiner*—David R. Hudspeth
*Assistant Examiner*—Talivaldis Ivars Smits
*Attorney, Agent, or Firm*—Robert P. Tassinari, Jr.; Louis P. Herzberg

[57] ABSTRACT

A method and apparatus for using a tree structure to constrain a time-synchronous, fast search for candidate words in an acoustic stream is described. A minimum stay of three frames in each graph node visited is imposed by allowing transitions only every third frame. This constraint enables the simplest possible Markov model for each phoneme while enforcing the desired minimum duration. The fast, time-synchronous search for likely words is done for an entire sentence/utterance. The list of hypotheses beginning at each time frame is stored for providing, on-demand, lists of contender/candidate words to the asynchronous, detailed match phase of decoding.

27 Claims, 14 Drawing Sheets

| VOCABULARY WORD | WORD PHONEME REPRESENTATION |
|---|---|
| ANNE | AE N |
| ANT | AE N T |
| AT | AE T |
| IN | IH N |
| IT | IH T |

101 — VOCABULARY WORD
102 — WORD PHONEME REPRESENTATION

FIG. 1

| VOCABULARY WORD | PHONEME REPRESENTATION |
|---|---|
| ANNE | N AE |
| ANT | T N AE |
| AT | T AE |
| IN | N IH |
| IT | T IH |

FIG. 8

| SPEAKER | ERRORS | WORDS | %ERROR | FM Sec |
|---|---|---|---|---|
| h1c4t202 | 48 | 404 | 11.88 | 659.2 |
| h1c4t302 | 20 | 391 | 5.12 | 586.3 |
| h1c4t402 | 37 | 334 | 11.08 | 545.1 |
| h1c4t602 | 116 | 382 | 30.37 | 707.2 |
| h1c4t702 | 54 | 476 | 11.34 | 734.1 |
| h1c4t802 | 45 | 320 | 14.06 | 524.5 |
| h1c4t902 | 27 | 371 | 7.28 | 612.2 |
| h1c4ta02 | 33 | 379 | 8.71 | 820.0 |
| h1c4tb02 | 60 | 322 | 18.63 | 520.2 |
| h1c4tc02 | 31 | 418 | 7.42 | 816.0 |
| h1c4te02 | 48 | 429 | 11.19 | 684.4 |
| h1c4tg02 | 61 | 336 | 18.15 | 634.2 |
| h1c4tj02 | 56 | 342 | 16.37 | 800.9 |
| h1c4tk02 | 47 | 390 | 12.05 | 872.0 |
| total | 683 | 5294 | 12.90 | 9516.3 |

FIG. 13

| SPEAKER | ERRORS | WORDS | %ERROR | FM Sec |
|---|---|---|---|---|
| h1c4t202 | 49 | 404 | 12.13 | 91.2 |
| h1c4t302 | 23 | 391 | 5.88 | 80.6 |
| h1c4t402 | 40 | 334 | 11.98 | 67.0 |
| h1c4t602 | 133 | 382 | 34.82 | 72.0 |
| h1c4t702 | 46 | 476 | 9.66 | 100.4 |
| h1c4t802 | 52 | 320 | 16.25 | 66.3 |
| h1c4t902 | 32 | 371 | 8.63 | 87.2 |
| h1c4ta02 | 31 | 379 | 8.18 | 80.3 |
| h1c4tb02 | 62 | 322 | 19.25 | 63.5 |
| h1c4tc02 | 41 | 418 | 9.81 | 83.8 |
| h1c4te02 | 49 | 429 | 11.42 | 99.0 |
| h1c4tg02 | 59 | 336 | 17.56 | 86.1 |
| h1c4tj02 | 55 | 342 | 16.08 | 72.8 |
| h1c4tk02 | 52 | 390 | 13.33 | 80.2 |
| total | 724 | 5294 | 13.68 | 1130.4 |

FIG. 14

METHOD AND APPARATUS FOR A TIME-SYNCHRONOUS TREE-BASED SEARCH STRATEGY

FIELD OF THE INVENTION

The present invention is directed to the field of speech recognition. It is more particularly directed to acoustic search strategies.

BACKGROUND OF THE INVENTION

It is a constant endeavor to find ways of speeding up the recognition of acoustic signals. A common tactic in large vocabulary automatic speech recognition systems is to quickly provide a short list of about fifty likely candidate words from a vocabulary consisting of several thousand words. Subsequently, detailed models for each of the words in this short list are used to match and score the word to the acoustic signal. The sequence of words with the highest score is chosen. The process of determining the short list, called the fast match or FM, reduces to a manageable number the hypotheses investigated by detailed acoustic models. It thereby results in a speech decoding system which operates with acceptable speed. An efficient representation of the vocabulary in terms of context-independent phonemes is a tree structure. FIG. 1 shows a sample vocabulary consisting of just five words with their phoneme constituents. The vocabulary is represented graphically in the form of a tree shown in FIG. 2. FIG. 2 starts with a root node 202 which corresponds to the beginning of an utterance. The tree is formed by tying together in a single node all phonemes shared from the beginning of the word. A word ending is referred to as a leaf 208, 212, 216, 222 and 226. In the example, there are two distinct phonemes, 'AE' 204 and 'IH' 218 which can start a word. Coincidentally, both of these have the same set of potential successors, 'N' 206/220 and 'T' 214/224. The sequence 'AEN' may be followed by a 'T' 210. Traversing the tree from the root 202 to one of leaves, spells out the word in the vocabulary indicated at the leaf. Use of this tree structure for speech recognition provides a representation of the complete vocabulary in accordance with the phoneme sequences that constitute each particular word in that vocabulary.

In one recognition system, each node of the fast match tree is expanded into a set of three states 301–303 as in FIG. 3. State three 303 has a self loop 304. The omission of self-loops on the first and second states 301, 302, reduces greatly the number of possible paths through the model. This results in a faster search than a model having self-loops on each of the states. Self-loops are generally employed in all states of the detailed match. This topology enforces a minimum stay of three frames in each phoneme which has been found to be highly desirable.

The flow of an existing recognition system is shown in FIG. 4. From the process start 402, the system goes into a wait state 404, and waits for an utterance. In the wait state 404 the system recognizes silence, and forms a first candidate list corresponding to silence. Thus, the first candidate list has only one entry which is silence. Generally, each word in a candidate list has an associated probability of occurrence. The probability is related to the relative frequency of occurrence of the word in the language's use. When an utterance is received, a detailed match of each entry in the list candidate is performed, and a probability distribution of possible ending times of that word is computed, 408. In the first iteration the only entry is silence. After each detailed match, a determination is made if the end of the utterance has been reached 410. If not, this distribution is used to perform a next fast match computation 412, and a next candidate list of words to follow the current most likely word is computed, 414. Again, a likelihood score for each of these new next candidate words is computed by the detailed match, along with its corresponding end-time probability distribution, 408. If the utterance is still not ended 410, this distribution is used in a next fast match computation 412, to determine a next set of candidate words, 414. This is continued until the end of the utterance is sensed, 410. The resulting decoded utterance is displayed and/or stored, 416 and the recognition process for that utterance is completed and the process stops, 418.

Examination of the method just described, reveals that each fast match results in a subsequent fast match search fort the next set of candidates to be evaluated. A fast match search is performed in the time region where the detailed match hypothesizes a word ending. Overlap in time due to multiple detailed matches which end in the same time region causes the method to perform wasteful redundancy of computations, in that it often repeats a fast match computation on the same data. This is a waste of assets and time. Thus, one aspect of this invention is to modify the recognition method from a process which alternates between detailed match and a fast match, to a process which computes all fast match candidate lists for an entire utterance and stores them in a table. The table is subsequently accessed for look-up by a contiguous and complete detailed match phase. This detailed match phase is only implemented following the entire fast match computations.

Another aspect of this invention is a simplification to the phoneme topology such as to reduce the number of states in the search procedure. The maintenance of a minimum stay of three frames in each graph node visited is imposed by allowing transitions only every third frame. This constraint enables the simplest possible Markov model for each phoneme.

For the purposes of this invention, the following definitions apply:

| | |
|---|---|
| active list: | list of nodes whose log score is within a user-defined parameter D of the log of the highest scoring node at the current time. |
| potentials list: | list of nodes potentially active at the next time frame given the set of currently active nodes. The potentials list includes the set of currently active nodes and their successors in the fast match graph. |
| next active list: | set of nodes in potentials list whose score is sufficiently high to allow the node to be included in the active list at the next time triplet. |
| contender list: | is often called "acoustic fast match list" |
| candidate list: | is often called "final fast match list" |
| utterance: | a string of acoustic signals (words) to be decoded for speech recognition. It is most often a 'sentence', although it need not be a complete sentence. |

| | |
|---|---|
| active node: | a node whose score is within a user-defined range parameter 'D' of the highest scoring node at that time. |
| phoneme: | is an individual speech sound; the building blocks of words. For example the word "she" is comprised of 2 phonemes: SH and IY. Often, one can think of phonemes as the constituent entries in the pronunciation of a word in the dictionary. |
| candidate: | A vocabulary word, or group of words, resulting from the fast match algorithm, which is/are possibilities for the words forming the acoustic signal. Each candidate is evaluated by the detailed match phase of decoding, in order to find the best scoring string of words which match the acoustics being recognized. |
| hypothesis: | same as candidate. |
| triangular window: | weighting function shaped like a triangle when plotted. this is used to combine lists associated with a range of times into a single list. For example the weights 0.1 0.6 1.1 0.6 0.1: applied to 5 consecutive lists of words would multiply the scores in the first and fifth list by 0.1, in the second and fourth list by 0.6, and the third list by 1.1. This would give preference to words in the third list by increasing their scores while decreasing the scores of words in the other lists. similarly the second and fourth lists would be given preference to the first and fifth lists. |
| call: | refers to a function call in a computer program. Call to DM means executing the detailed match function. since the program iterates, the detailed match function is executed many times; |
| next call: | means the next time the function is executed. |
| range (D): | A contender and/or candidate inclusion range parameter, relating the log of the candidate/node score to the log of the score of the node with the maximum score at a particular time. 'D' is typically between 10 and 17. A small value results in a faster recognition process, but potentially more error prone recognition process. |
| test sentence: | refers to a chunk of speech (said by a speaker) upon which the recognition process is being implemented. |
| beam: | refers to the set of nodes with have a sufficiently high score. It is often computed by finding the log of the score of the highest scoring node 'Nmax' at each time, and subtracting a constant (range parameter) D from it. Any node with a score with a log greater than 'Nmax' minus 'D', is said to be in the beam. |
| beam search: | a method wherein only evaluations are performed only for those nodes which are possible followers to nodes with a sufficiently high score, rather than evaluating the score for every node in the node versus time matrix. |
| Viterbi score: | Scores are either 'unnormalized' or 'normalized'. Unnormalized scores get smaller as time goes on, so it is not meaningful to compare the scores of different times. Therefore the scores are normalized to enable comparisons of scores at different times. A normalized Viterbi score refers to the scores of the nodes at a given time in a matrix of scores. Normalization of the score of a node 'N' at any time may be implemented by taking the difference in unnormalized scores between the best-scoring node 'Nmax' (at that time) and the unnormalized score of node 'N'. These normalized scores can be meaningfully compared at different times. |
| time frame: | a particular time duration, usually 10 millisecond. It can also be understood as a 'point in time'. | active list of nodes whose log score is
list: within a user-defined parameter D of the log of the highest scoring node at the current time.

potentials list: list of nodes potentially active at the next time frame given the set of currently active nodes. The potentials list includes the set of currently active nodes and their successors in the fast match graph.

next active list: set of nodes in potentials list whose score is sufficiently high to allow the node to be included in the active list at the next time triplet.

contender: is often called "acoustic list: fast match list"

candidate list: is often called "final fast match list"

utterance: a string of acoustic signals (words) to be decoded for speech recognition. It is most often a 'sentence', although it need not be a complete sentence.

active node: a node whose score is within a user-defined range parameter 'D' of the highest scoring node at that time.

phoneme: is an individual speech sound; the building blocks of words. For example the word "she" is comprised of 2 phonemes: SH and IY. Often, one can think of phonemes as the constituent entries in the pronunciation of a word in the dictionary.

candidate: A vocabulary word, or group of words, resulting from the fast match algorithm, which is/are possibilities for the words forming the acoustic signal. Each candidate is evaluated by the detailed match phase of decoding, in order to find the best scoring string of words which match the acoustics being recognized.

hypothesis: same as candidate.

triangular window: weighting function shaped like a triangle when plotted. This is used to combine lists associated with a range of times into a single list. For example the weights 0.1 0.6 1.1 0.6 0.1: applied to 5 consecutive lists of words would multiply the scores in the first and fifth list by 0.1, in the second and fourth list by 0.6, and the third list by 1.1. This would give preference to words in the third list by increasing their scores while decreasing the scores of words in the other lists. Similarly the second and fourth lists would be given preference to the first and fifth lists.

call: refers to a function call in a computer program. Call to DM means executing the detailed match function. Since the program iterates, the detailed match function is executed many times;

next call: means the next time the function is executed.

range (D): A contender and/or candidate inclusion range parameter, relating the log of the candidate/node score to the log of the score of the node with the maximum score at a particular time. 'D' is typically between 10 and 17. A small value results in a faster recognition process, but potentially more error prone recognition process.

test sentence: refers to a chunk of speech (said by a speaker) upon which the recognition process is being implemented.

beam: refers to the set of nodes with have a sufficiently high score. It is often computed by finding the log of the score of the highest scoring node 'Nmax' at each time, and subtracting a constant (range parameter) D from it. Any node with a score with a log greater than 'Nmax' minus 'D', is said to be in the beam.

beam search: a method wherein only evaluations are performed only for those nodes which are possible followers to nodes with a sufficiently high score, rather than evaluating the score for every node in the node versus time matrix.

Viterbi score: Scores are either 'unnormalized' or 'normalized'. Unnormalized scores get smaller as time goes on, so it is not meaningful to compare the scores of different times. Therefore the scores are normalized to enable comparisons of scores at different times.

A normalized Viterbi score refers to the scores of the nodes at a given time in a matrix of scores. Normalization of the score of a node 'N' at any time may be implemented by taking the difference in unnormalized scores between the best-scoring node 'Nmax' (at that time) and the unnormalized score of node 'N'. These normalized scores can be meaningfully compared at different times.

time frame: a particular time duration, usually 10 millisecond. It can also be understood as a 'point in time'.

SUMMARY OF THE INVENTION

It is an object of the present invention to provide a method and apparatus for using a tree structure to constrain a time-synchronous, fast search for candidate words in an acoustic stream is described. A minimum stay of three frames in each graph node visited is imposed by allowing transitions only every third frame. This constraint enables the simplest possible Markov model for each phoneme while enforcing the desired minimum duration. The fast, time-synchronous search for likely words is done for an entire sentence. The lists of hypotheses beginning at each time frame are stored for providing, on-demand, lists of candidate words to the asynchronous, detailed match phase of decoding.

Another aspect of this invention is to modify the recognition method from a process which alternates between detailed match and a fast match, to a process which computes all fast match candidate lists for an entire utterance and stores them in a table. The table is subsequently accessed for look-up by a contiguous and complete detailed match phase. This detailed match phase is only implemented following the entire fast match computations. The process change is enabled by adding arcs from each leaf node back to the root. This enables the graphical representation of an entire sequence of vocabulary words, rather than just one word. Another aspect of this invention is to provide a speech recognition method for recognizing an entire utterance, for a system including a detailed match procedure. The method comprising the step of performing a fast match process for the entire utterance prior to executing the detailed match procedure. In an embodiment the fast match process is performed in an iterative manner with an iteration performed for each of a plurality of frame triplets and/or each phoneme in a fast match graph is represented as a single state with a self loop, and/or the fast match process proceeds backward from an end of the entire utterance towards a beginning of the entire utterance. In some embodiments the method further comprises: providing a fast match graph for a speech language vocabulary, wherein the fast match graph corresponds to a backward search, and wherein the graph has arcs having destinations exiting a given node and are stored as the successors to that node, while the sources of the incoming arcs are stored as its predecessors; storing the phoneme identity of each node in the fast match graph is stored for use in a Viterbi search; storing an identity of each word formed by a group of phonemes; and invoking dynamic programming of the Viterbi search to enable construction of lists of potential words at each of the plurality of frame triplets.

Another aspect of this invention is to provide a speech recognition system for recognizing an entire utterance and having means for receiving and executing a detailed match procedure. The system comprises means for performing a fast match on the entire utterance prior to executing the detailed match procedure. In an embodiment the fast match process is performed in an iterative manner with an iteration performed for each of a plurality of frame triplets and/or the fast match process proceeds backward from an end of the entire utterance towards a beginning of the entire utterance.

Still another aspect of this invention is a speech recognition method for recognizing an entire utterance segmented into a plurality of frames and based upon a speech language vocabulary. The method comprising: receiving an utterance; forming an acoustic signal of a plurality of phoneme constituents making up the utterance; combining three of the frames to form a frame triplet; initiating a fast match for the utterance by forming a phoneme probability matrix table giving probabilities of each phoneme versus an acoustic observation time, wherein the phoneme matrix table has each column corresponding to a single frame; multiplying together a group of three individual probabilities of the three frames that make up each the triplet to produce a joint probability of the triplet for each particular the phoneme and triplet; forming a triplet probability matrix representing a complete observation time of the utterance and having a row for each phoneme of the utterance and a column for each the triplet; and invoking a synchronous iterative process to perform the fast match for the entire utterance in steps of frame triplets.

In some embodiments the method further comprises: initializing to the root node and to the end of the utterance; determining for each potentially active node 'n' at a next time τ, a maximum of a node at time τ+3 which maximizes the product of a score of the node with the transition probability from the node into a potentially active node; computing the score s(τ,n) of the potentially active node given by a product of the maximum and an observation probability at a current time of the phoneme identified with state 'n'; determining a maximum score of the node scores at the current time; comparing the score for each potentially active node to the maximum score; including in a next active list, only active nodes for which the difference between the log of the active node score and the log of the maximum score is less than a user-specified range constant; and adding to a matrix of contender words at an appropriate time, a new node placed in the next active list which corresponds to a beginning of a whole word, and a new node score of the new node. Often the matrix of contender words is made available to a detailed match process. In some cases the new node score is obtained by multiplying an unnormalized backward score of the new node by an unnormalized forward score of a root node. Frequently the method further comprises the steps of: forming a 'next potentials list' from the 'current active list' if an utterance beginning has not been reached; computing and storing a score for each node in the 'potentials list'; finding and storing a current highest node score; choosing and using an inclusion range parameter to form the 'next active list'; entering and storing active list entries for each triplet in a 'matrix of contender words'; decrementing to a next backward frame triplet; modifying the 'current active list' to correspond with the next active list; and stopping the fast match process if the utterance beginning has been reached.

Another aspect of this invention is a speech recognition method for recognizing an entire utterance, for a system including a fast match process and a detailed match procedure, wherein the fast match process proceeds backward from an end of the entire utterance towards a beginning of the entire utterance.

Another aspect of this invention is a speech recognition method for recognizing an utterance, for a system including a fast match process, wherein the fast match process is performed in an iterative manner with an iteration performed for each of a plurality of frames. Often each phoneme in a fast match graph is represented as a single state with a self loop.

Still another aspect of this invention is a speech recognition system for recognizing an utterance. The system comprises a fast match process which proceeds backward from an end of the utterance towards a beginning of the utterance.

Still another aspect of this invention is to provide a speech recognition system including a fast match process, wherein the fast match process is performed in an iterative manner with an iteration performed for each of a plurality of frames. In an embodiment each phoneme in a fast match graph is represented as a single state with a self loop.

In some embodiments an unnormalized forward score of the root node is obtained from a detailed match procedure.

BRIEF DESCRIPTION OF THE DRAWINGS

These and other objects, features, and advantages of the present invention will become apparent upon further consideration of the following detailed description of the invention when read in conjunction with the drawing figures, in which:

FIG. 1 shows a sample vocabulary consisting of just five words with their phoneme constituents;

FIG. 8 shows a reversal of the phonetic spellings for the vocabulary of FIG. 1 in accordance with the present invention;

FIG. 13 shows tabular results of error rates and time spent in the fast match computation (normalized to a 133 MHz processor) for individual speakers, when using a previous fast match decoding process;

FIG. 14 shows the tabular results of error rates and time spent in the fast match computation (normalized to a 133 MHz processor) for individual speakers, when using the fast match method and/or system of this invention.

DETAILED DESCRIPTION OF THE INVENTION

The present invention increases the efficiency of a speech recognition process. In one aspect, it modifies the recognition process from one which alternates between detailed match and fast match determinations, to one which computes all fast match candidate lists for an entire utterance and stores them in a table. The table is subsequently accessed for look-up by a single complete detailed match phase which only starts following the entire fast match computations. As described above, a previously established method of reducing the number of states to be searched in the fast match procedure is to organize the phonemic representations of the words in the vocabulary in the form of a tree, with a common acoustic model for each phoneme independent of its context. A method of the present invention converts a fast match tree into a fast match graph capable of representing arbitrary sequences of words. This is accomplished by adding an arc from each leaf (word ending) back to the root node. A transition probability is assigned to each arc of the graph as '1/N' where 'N' is the number of arcs leaving the source node. A self-loop probability of 0.5 is implicitly assumed for each node. This has the effect of scaling the transition arcs out of each node by the same factor. Thus the self-loop need not be included in the computation. Furthermore, the transition probability from leaf to root is multiplied by the relative frequency of occurrence of the word in the vocabulary's language. The FM graph is used to constrain a dynamic programming search in which transition states correspond directly to nodes in the fast match graph. A Viterbi algorithm is used to find the most-likely path through the state-space. Any word along a path within a threshold of the most-likely path is included as a fast match candidate. This is depicted in FIG. 5.

Figure 2:
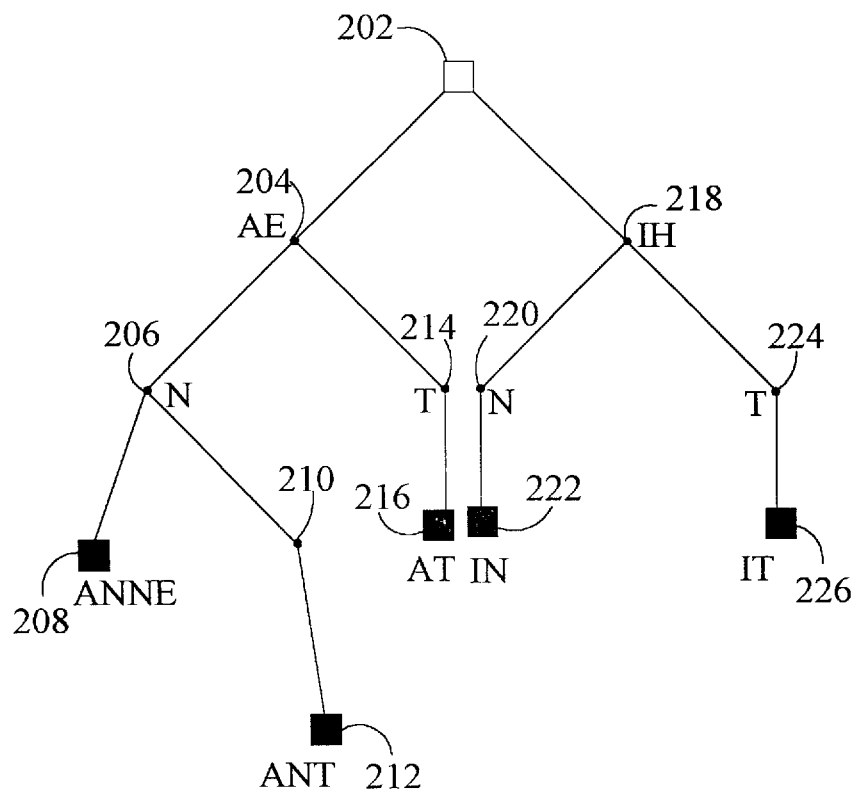
FIG. 2 shows a graphical representation of the vocabulary of FIG. 1 in the form of a tree.
Figure 3:
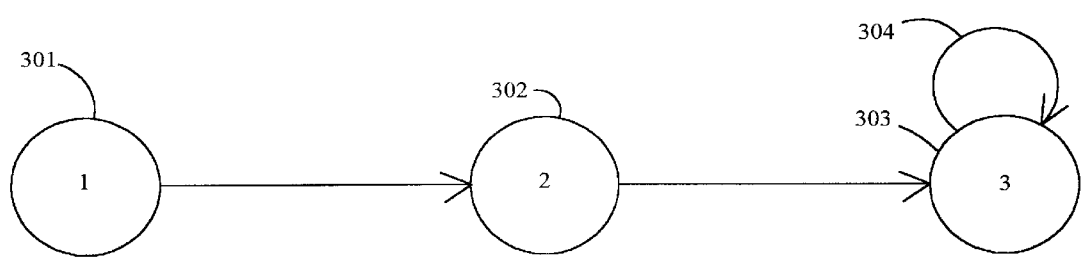
FIG. 3 shows the expansion of a node of the fast match tree into a set of three states in accordance with the present invention.
Figure 4:
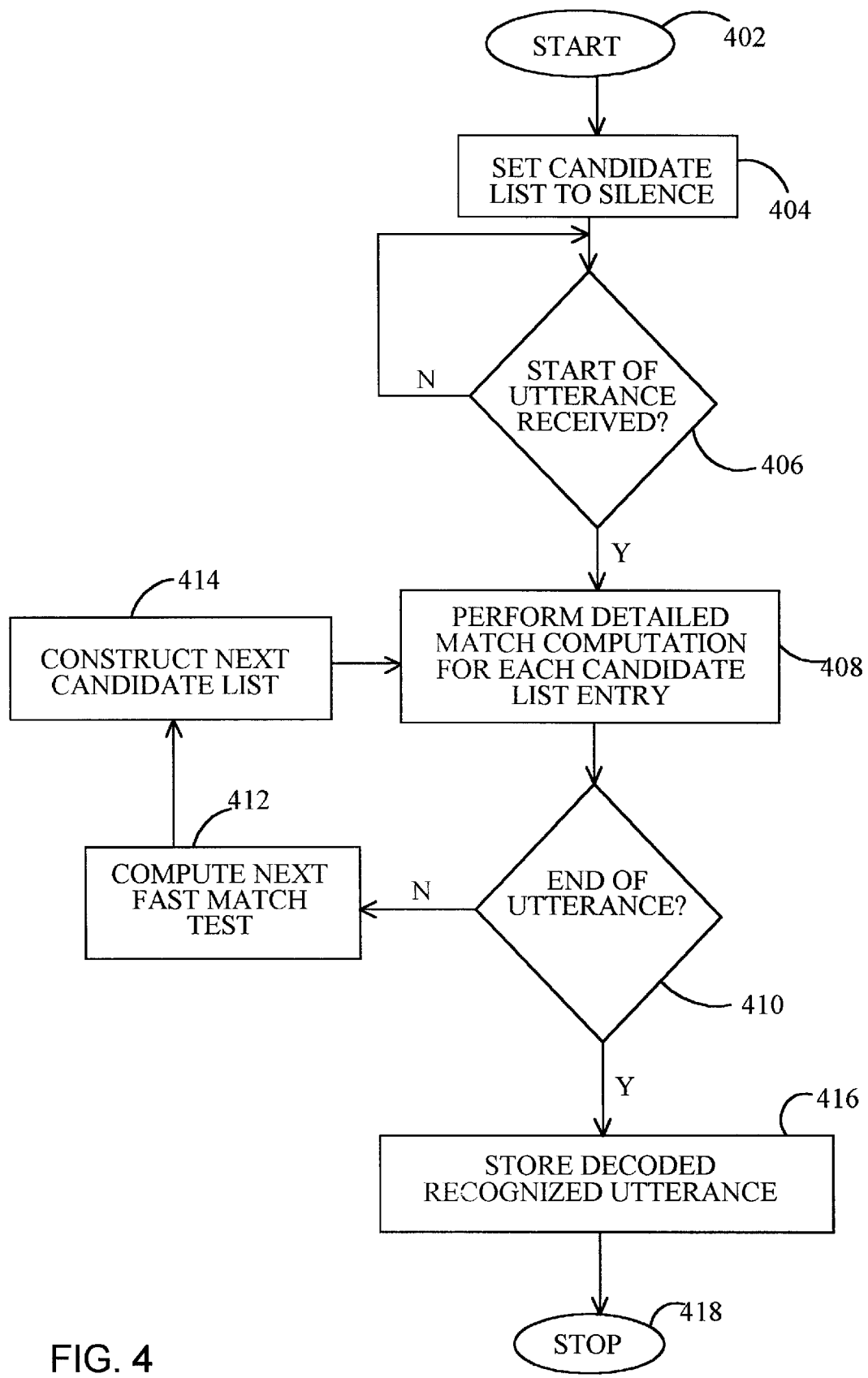
FIG. 4 shows the flow of an existing recognition system.
Figure 5:
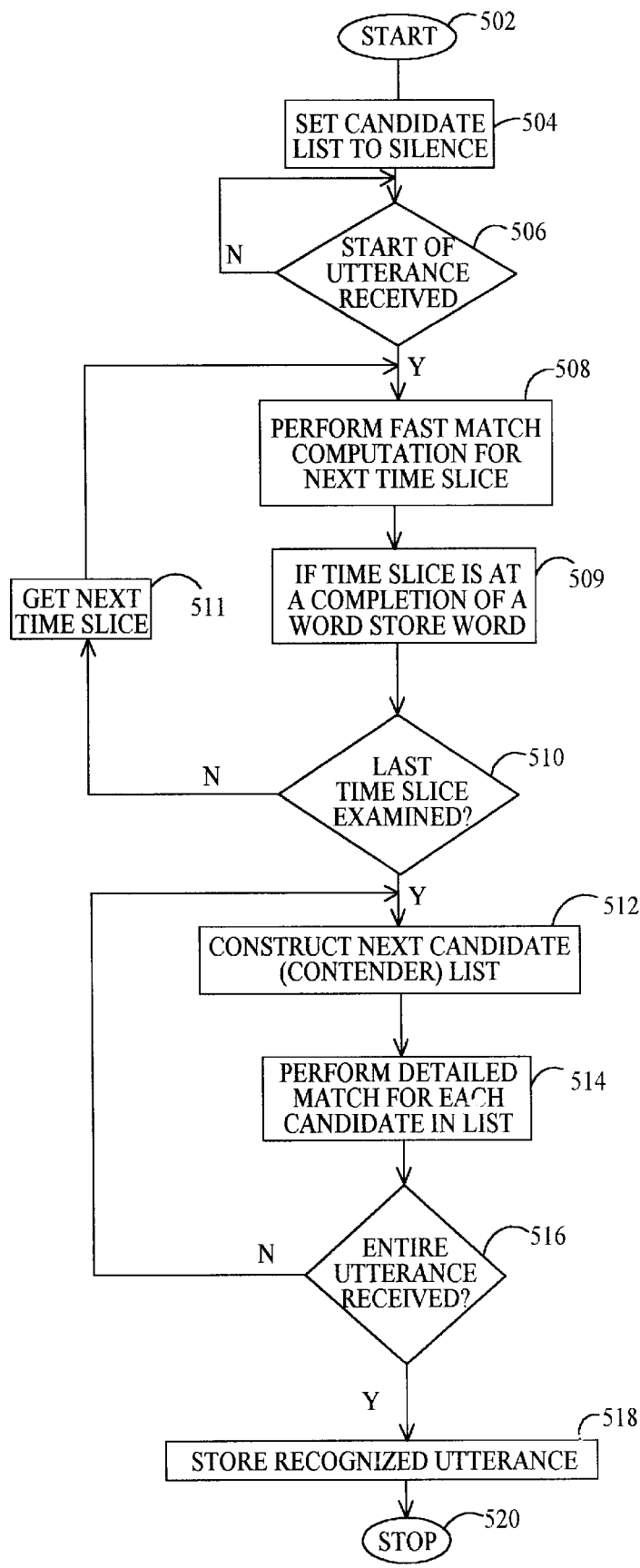
FIG. 5 shows a flow chart for a recognition method and/or system wherein fast match computations are performed for the entire utterance prior to the implementation of the detailed match in accordance with the present invention.

FIG. 5 shows a flow chart for a recognition system wherein fast match computations are performed for the entire utterance prior to the implementation of the detailed match. At the start of the recognition process 502, a first candidate list is formed which consists only of silence 504. The system waits for the start of the utterance, 506. Upon receiving an utterance's acoustic signal is partitioned into contiguous time slices. A fast match computation is performed on the next time slice, 508. At the utterance beginning this is the first part of its acoustic signal. A determination is made if that next time slice corresponds to an end of a word, 509. If it does, the word is stored in a next fast match list. If the time slice is not the last time slice of the utterance 510, the next time slice is retrieved 511. Steps 508–511 are repeated until the last time slice is examined. Then starting with the first candidate list and the first fast match list stored in the table a next candidate list is constructed 512. Each next candidate list consists of a subset of each fast match list. Each subset contains a limited number of most likely words having the highest probability of occurrence. In one embodiment, a candidate list has fifty words or less. A complete and contiguous detailed match is performed for each candidate in each next candidate list, 514. Each next candidate list is constructed 512 in correspondence with each subsequent fast match list stored in the table. When the entire utterance is decoded 516, the recognized utterance is stored and/or displayed 518, and the recognition process is stopped 520.

This change is enabled by adding arcs from each leaf node back to the root thereby enabling the representation of an arbitrary utterance of a group of vocabulary words rather than just one word. The graphical representation of this process requires that each word of the arbitrary utterance start and terminates in the root node as shown in FIG. 6.

Figure 6:
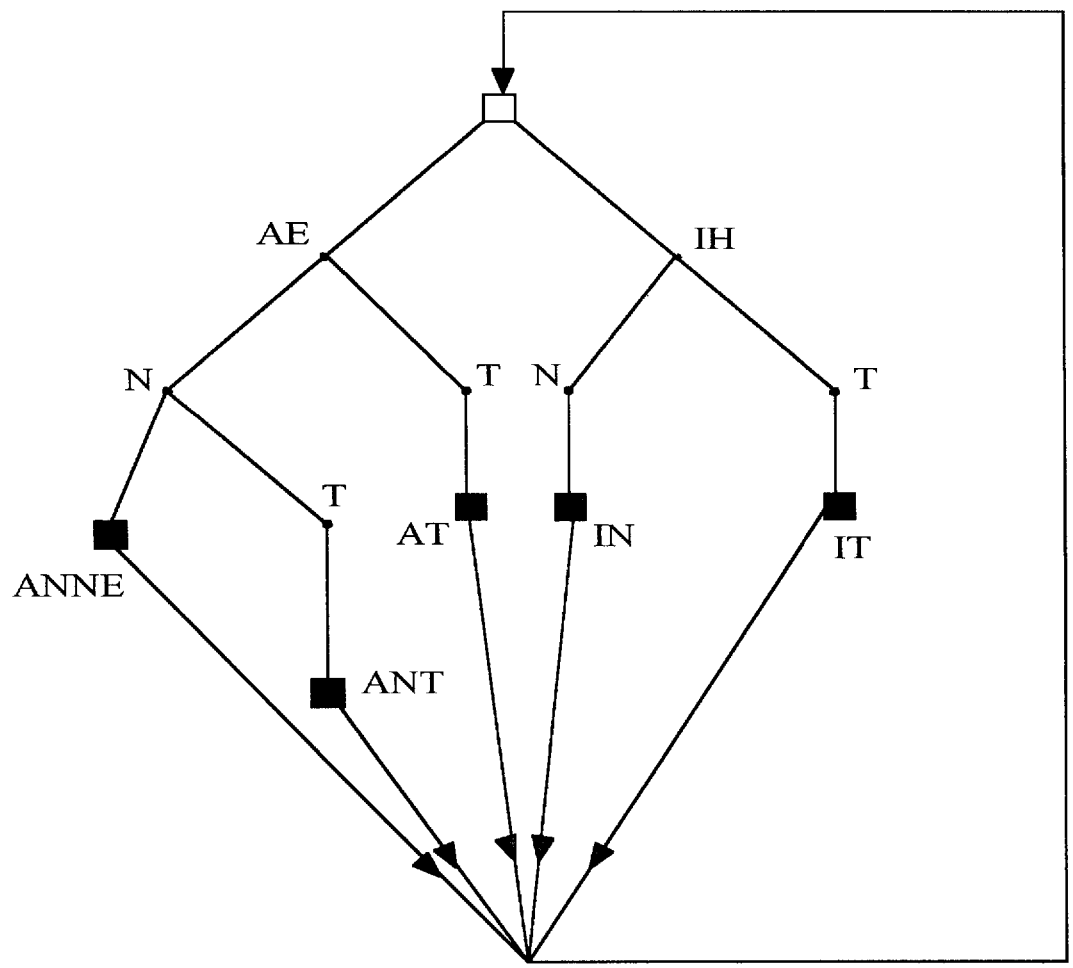
FIG. 6 shows a graph for the vocabulary of FIG. 1.

FIG. 6 shows a graph 600 for the vocabulary of FIG. 1. A graph differs from a tree in that it has no dangling unterminated leaves. In a graph each word terminates in the root, 602. Thus any utterance containing a particular number of vocabulary words is represented by cycling the graph that particular number of times. Each cycle represents the next consecutive word of the utterance.

As an example of the benefit of this aspect of the invention, consider the vocabulary of FIG. 1, for a case in which the candidate list returned by the fast match contains the words ANNE and ANT. In a previous procedure, the detailed match extends the word ANNE and finds a non-zero probability of it to end between times 't1' and 't3'. A fast match computation is then performed in search of words starting in this time region. Assume that the detailed match extension of the word ANT returned a non-zero probability of ending between times 't2' and 't4', where 't2' is after 't1' but before 't3'. The fast match computation performed on this start-time distribution repeats the fast match computation due to the end of ANNE for all frames between 't2' and 't3'. This repetitive computation, is costly in terms of speed and assets. It is eliminated in the aforementioned process of the current invention.

Another aspect of this invention includes a simplification to the phoneme topology to reduce the number of states in the search procedure. This topology maintains the desired minimum stay of three frames is maintained in each phoneme by agglomerating three frames into a 'frame triplet'. Generally, each 10 millisecond time slice of the acoustic signal forms a frame. The entire acoustic signal is thereby represented by a series of contiguous frames upon which the speech recognition process steps are performed. In this case, a 'frame triplet' represent a 30 millisecond time slice of the acoustic signal. The probability of occurrence of each frame triplet is computed by multiplying together for each phoneme the probabilities of each of the three frame triplet constituents for that phoneme. The maintenance of a minimum stay of three frames in each graph node visited is imposed by allowing transitions only every third frame. It is hypothesized that this constraint enables the simplest possible Markov model for each phoneme.

Figure 7:
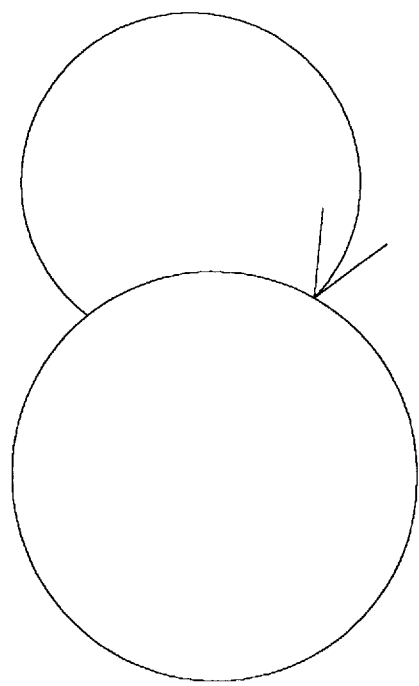
FIG. 7 shows use of a simplified, single-state graph topology for an embodiment of the present invention.

In one embodiment of the present invention, use is made of a simplified, single-state graph topology shown in FIG. 7. This effectively reduces the complexity of the search relative to the three-state fast match topology. It thereby decreases the time needed to perform the candidate search. A time-synchronous algorithm is employed in which the score of each candidate reflects the match of its model to the acoustics. It also reflects the match of the candidates along the most-likely acoustic word sequence from the beginning of the utterance to the start of the current candidate. Allowing transitions only every third frame, enables the maintenance of the desired three-frame minimum duration. A modified Viterbi search is used to find the best sequence of states for a test utterance in which one state is occupied for each frame triplet in the utterance.

The score 's' for a node 'n' in the fast match tree is computed at each triplet. At any point in time 'τ', the score at a triplet which includes the frames at times 'τ', 'τ–1' and 'τ–2', is given by:

$$s(\tau,n) = p_n(\tau) p_n(\tau-1) p_n(\tau-2) \max_i [s(\tau-3,i) t(i,n)] \quad (1)$$

where:

'$p_n(\tau)$' is the probability of the phoneme associated with node 'n' occurring at time 'τ';

'$p_n(\tau-1)$' is the probability of the phoneme associated with node 'n' occurring at time 'τ–1', '$p_n(\tau-2)$' is the probability of the phoneme associated with node 'n' occurring at time 'τ–2', 't(i,n)' is the transition probability associated with the arc connecting node 'i' to node 'n', t(i,n) being taken over all currently active nodes 'i' which are predecessor nodes to node 'n', as defined by the fast match tree;

s(τ–3,i) is the score of node i for the previous time triplet, i.e. the set of three frames ending at time (τ–3); and $\max_i [s(\tau-3,i) t(i,n)]$ is taken over all currently active nodes 'i' which are predecessor nodes to 'n', as defined by the fast match tree.

Context independent models are obtained by taking as the probability of a phoneme, the maximum probability over all leaves associated with each phoneme in the detailed match models. At a given time, an 'active node' is defined as a node whose score is within a user-defined range parameter 'D' of the highest scoring node at that time. 'D' is often given a value of 12.

For each active node, its score and root exit time are stored. The root exit time is the time of exit from the root of the tree along the best path to that node. For each active node which corresponds to a leaf of the fast match tree, we enter the word in the list of candidates starting at the stored most-likely starting time of that word. Into the list of candidate scores we enter the difference in scores between its ending state and the best scoring node at the time the word ended.

In the dynamic programming search, the quality of the path history leading up to the beginning of a word weights the score for that word. Furthermore, contrary to current system, no repeated computations in the fast match will occur. The implementation of the algorithm in the decoder takes the following steps:

First, a set of phoneme probabilities for an utterance, is computed. Then lists of candidate words and their scores over the entire utterance using the modified Viterbi search are computed.

During the detailed match phase of decoding when we need candidates are needed over a particular time window. These are retrieved from the previously-computed candidate lists associated with that window's starting times. The acoustic scores returned by the fast match are weighted by a triangular window centered around the most-likely word boundary as determined by the previous detailed match. These are combined with the language model scores, sorted, and truncated to produce a short list of candidate words to be evaluated in the next call to the detailed match.

An alternate embodiment of the invention reverses the direction of fast match computations. Among other things, this overcomes a weakness of the algorithm which is inherent to the Viterbi search. In the search, only the best path to a given node at a given time is saved. In some cases, however, the beginning of a word is not clear. This is likely to occur, for example, when the first of a pair of words along a given path ends with the same phoneme which begins the second word. For example, in the acoustic signal for the two words 'this says', the boundary between the two words is not well defined. In a Viterbi search, however, only the single best segmentation is retained. This could be a number of frames away from where the detailed match is asking for candidates. This weakness is overcome by computing the fast match candidates backwards in time in accordance with this invention. That is, the fast match starts at the end of the utterance and works toward the utterance beginning. Reversing the computation requires a reversal of the fast match tree, as shown in FIG. 8 for vocabulary of FIG. 1. In FIG. 8 the order of the phonemes which constitute each word is reversed. The fast match tree is formed in the normal way, but using the reversed phoneme representation shown in FIG. 8. The dynamic programming scores are computed from the end to the beginning of the utterance. The paths are constrained by the reversed tree. In the case of the reversed tree of FIG. 8, a leaf corresponds to a word beginning. When a leaf occurs in the beam search, the associated word is entered in the fast match list associated with the time at which the leaf occurred. No carrying forward of word-beginning times is required. This results in a somewhat faster search requiring slightly less memory than the forward case. In one test this resulted in a 10 percent increase in speed. In this case, the memory may be reduced by one less integer per node. For example, in a fast match tree having 60,000 integers requiring 2 bytes each, this may result in about 120,000 bytes saved.

Consideration must be given to the scoring procedure. Generally, unnormalized Viterbi scores cannot be used as the fast match score. This is because at each time frame the scores are multiplied with another observation probability (always less than unity). This causes the scores at the end of the utterance to be much smaller than those at the beginning. Several choices exist for scoring the candidates in a beam.

One choice is to calculate the difference between the node's Viterbi score and the best Viterbi score seen at that time frame. This is a natural choice since it is the criterion used to define the beam. A useful scoring procedure normalizes backward scores by taking the difference between the score at the node 'n' being presently considered and the top of the beam. For example, consider the case of computing backwards in time. For a node 'n' at time 't', this method of scoring takes into account all observations from an observation time 't' to the time 'T' at the end of the utterance. It does not consider observations from the beginning utterance time '$\tau 0$' to time 't–1'. Thus, if a path indicates with a high score that a word begins at time 't', that word will be given a high score, even if no continuation of the path exists to time '$\tau 0$'. An alternative scoring procedure in accordance with an embodiment of the present invention, takes into account complete paths from '$\tau 0$' to 'T' for each candidate. In this alternative procedure, the backward scores are normalized by keeping track of the forward (in time) scores computed by the detailed match, and multiplying each backward score by the forward score of the root node. This normalization procedure scores a given word hypothesis according to its place along a complete path from start to the end of the utterance.

Still another embodiment of the present invention uses a partial backwards calculation procedure. One weakness of the previously described backwards computation is the fact that one must wait until the speaker finishes the utterance or sentence before beginning the decoding computations. However, it is noted that by detecting accurately specific intermediate speech events within the utterance, such as silence, allows the utterance to be segmented into chunks of speech separated by two of these specific speech events. One useful event is silence. Thus segments surrounded by silence may be analyzed independently. This eliminates the need to wait until the end of the entire utterance to begin the computation process.

Figure 9:
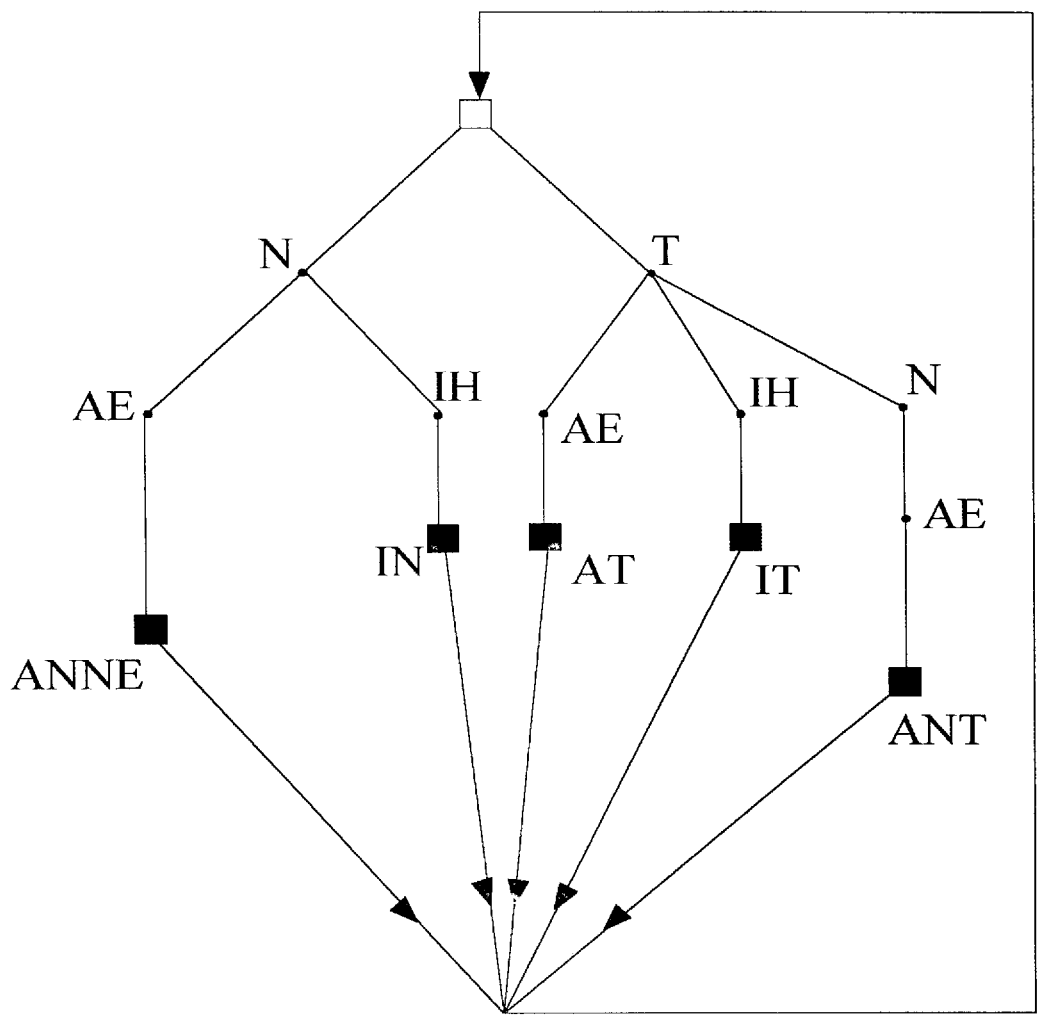
FIG. 9 shows the graph corresponding to a backward search of the vocabulary of FIG. 8, in accordance with the present invention.
Figure 10:
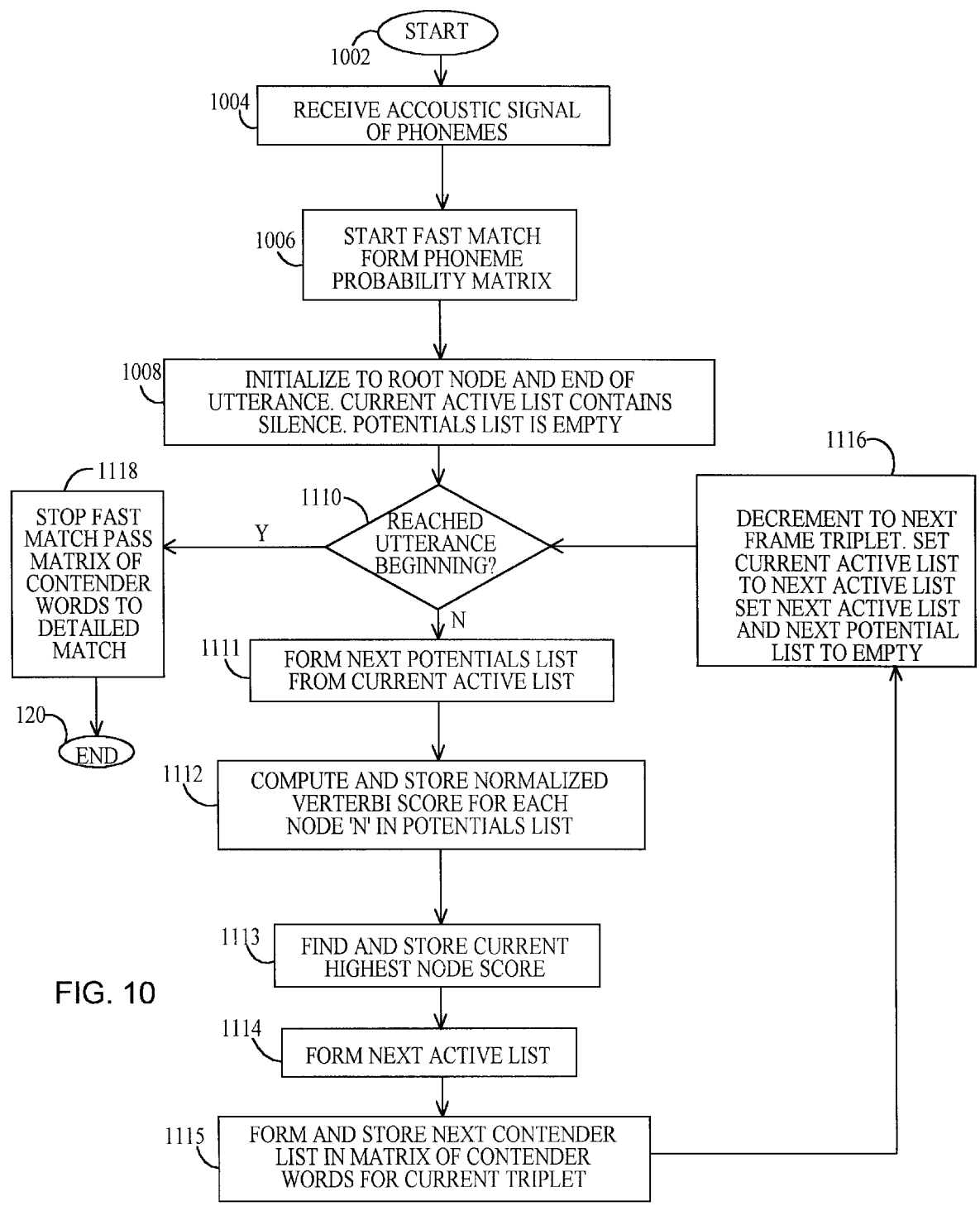
FIG. 10 shows a procedure for an embodiment implementing aspects of the present invention for an automatic speech recognition system.

An embodiment implementing aspects of the present invention uses the following procedure for an automatic speech recognition system. This is shown in FIG. 10. At the start 1002, a fast match graph is available. The graph is based on the pronunciation dictionary of the speech language vocabulary being recognized. The graph is capable of representing sequences of words for use in the Viterbi search dynamic programming computation of an utterance. An example of such a graph of a forward search is that shown in FIG. 6. The graph corresponding to a backward search, is shown in FIG. 9. This embodiment is described using a backward search in order to obtain the benefits described above.

The arcs in the fast match graph are traversed to define the constraints of the Viterbi search computation. The destinations of the arcs exiting a given node are stored as the successors to that node, while the sources of the incoming arcs are stored as its predecessors. The phoneme identity of each node in the FM graph is stored for use in a Viterbi search. The identity of each word formed by a group of phonemes is also stored in the FM graph. The graph is invoked for dynamic programming of the Viterbi search to enable the construction of lists of potential words at each time triplet. When an utterance is received, it is formed as an acoustic signal of the phoneme constituents making up the utterance. The acoustic signal is formed into an electrical signal identifying the sequence of phonemes received in each frame 1004. Three frames are combined to form a frame triplet in accordance with the present invention. A fast match is initiated for the received utterance by forming a phoneme probability matrix table. A phoneme probability matrix table gives the probabilities of each phoneme versus acoustic observation time.

Figure 11:
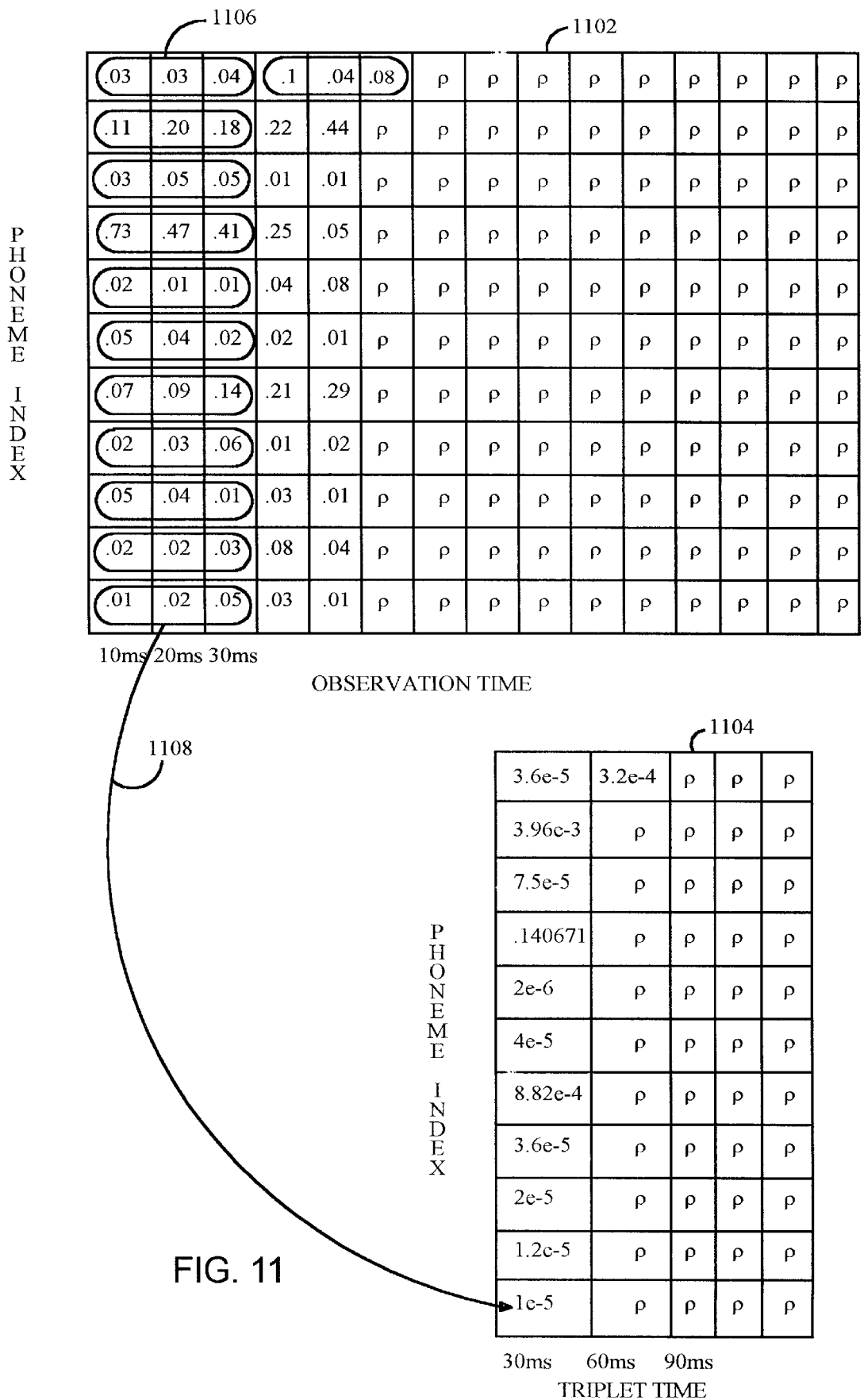
FIG. 11 shows a probability matrix table implemented on a single-frame by single-frame basis in accordance with previous methods, and the conversion of that representation into the triplet representation of the present invention.

FIG. 11 shows a probability matrix table 1102 implemented on a single-frame by single-frame basis in accordance with previous methods. Each row corresponds to a phoneme detected in the utterance, and each column corresponds to a (10 millisecond) frame of time. A cell corresponding to a row and column combination, contains an assigned probability of that row's phoneme at that column time frame. Some cells show a typical probability entry. Other cells just show a 'p' 1103, which represents a probability.

For the purposes of this embodiment, the phoneme matrix table is modified such that each column corresponds to a (30 millisecond) frame triplet 1104. For each particular phoneme and triplet, the three individual probabilities of the three frames that make up that frame triplet are multiplied together to produce the joint probability of the triplet 1108. The joint probabilities for each phoneme form the entries in the modified table 1104. Mathematically, since time in this table is quantized into (30 millisecond) triplet increments, the joint probability $Pr(\tau,\phi)$ of a given phoneme '$p_\phi$', within a frame triplet '$\tau$', stored in the table in matrix form is given as:

$$Pr(\tau,\phi) = p_\phi(\tau) p_\phi(\tau+1) p_\phi(\tau+2) \qquad (2)$$

This joint probability is entered for the cell corresponding to that triplet's column '$\tau$' in the row of that particular phoneme '$p_\phi$'. This is illustrated in FIG. 11 by circling together groups of three cells for observation times of 10 millisecond, 20 millisecond and 30 millisecond 1106.

Returning to the fast match process of FIG. 10, the triplet probability matrix is formed having a row for each phoneme of the received utterance and (30 millisecond) columns representing the complete observation time of that utterance 1006. A synchronous iterative process is invoked to perform the fast match for the entire utterance in steps of frame triplets. The process is initialized to the root node, and to the end of the utterance (silence) 1008. The only active node is the root node, and its score is set to zero. The 'current active list' (list of currently active nodes) contains only one entry, namely silence. At this point the 'potentials list' is empty. The 'potentials list' consists of all nodes potentially active at the next time frame given the set of currently active nodes. Because each state of the graph has a self-loop, each currently active node is included in the potentials list. Thus, the potentials list at each iteration is the set of currently active nodes and their successors in the fast match graph.

The iterative process is the heart of the dynamic programming. For each potentially active node 'n' at a next time $\tau$, the node at time $\tau+3$ which maximizes the product of its score with the transition probability from that node into the potentially active node is determined. The score $s(\tau,n)$ of the potentially active node is given by the product of this maximum and the observation probability at the current time of the phoneme identified with state 'n', so that:

$$s(\tau,n) = Pr(\tau,\phi\_n) \max_i s(\tau+3,i) t(i,n) \qquad (3)$$

The maximum of the node scores at the current time is determined. The score for each potentially active node is compared to that maximum. A node is included in the next active list, only if, at the current time, the difference between the log of its score and the log of the maximum score is less than a user-specified range constant 'D'. If a node placed in the next active list corresponds to the end of a whole word, that word and its score are added to a matrix of 'contender' words at the current time. This processing continues until the beginning of the utterance is reached thereby ending the fast match process. The words in a matrix of contender words (often about 500 words at a given time index) is made available to the detailed match process. The detailed match process is performed in a manner known to those familiar with the art. It uses the contender words to iteratively form candidate lists (of about 50 words) from which the final recognized words are taken.

Returning to FIG. 10, since this embodiment proceeds backwards from the end of the utterance (last received phoneme) towards the utterance beginning (the silence following the first received phoneme), a determination is made at each next triplet to determine if the utterance beginning has been reached 1110. If not reached, a 'next potentials list' is formed from the 'current active list' 1111. The normalized Viterbi score is computed and stored for each node in the 'potentials list' 1112, using equation (1). The current highest node score is found and stored 1113. An inclusion range parameter 'D' (often D=12) is chosen and used to form the 'next active list', 1114. The 'next active list' includes words which have a log score which is within the range 'D' of the log of the highest scoring node. The active list entries for each triplet are entered and stored in a 'matrix of contender words' 1115. The system is decremented to the next backward frame triplet. The 'current active list' is modified to correspond with the next active list. The next active list and the 'next potential list' are emptied 1116.

A determination is made if the utterance beginning has been reached 1110. If not reached, steps 1111–1116 are repeated until the utterance beginning has been reached. When it is reached, the fast match process is stopped 1118 with the matrix of contender words ready for the detailed match. Typically there are about 500 entries in the matrix of contender words. The process ends 1120.

Figure 12:
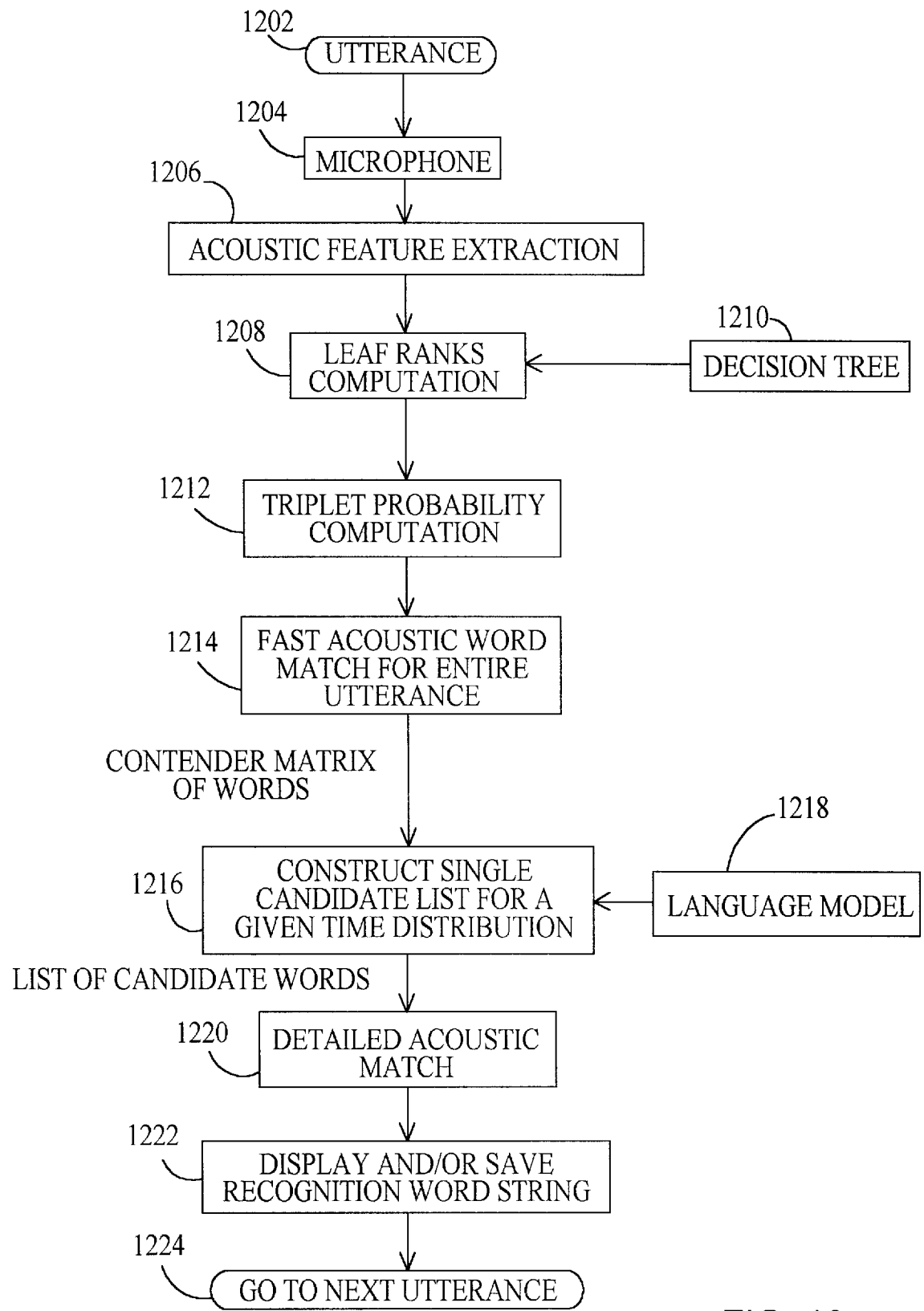
FIG. 12 shows how the fast match process/apparatus of this invention is embedded in a speech recognition system which utilizes the triplet computation and fast match results matrix of contender words according to the present invention.

FIG. 12 shows how the fast match process of this invention is embedded in a speech recognition system which utilizes the triplet computation and fast match results matrix of contender words according to the present invention. Operation of an overall speech recognition system is described, for example, in U.S. Pat. No. 5,263,117.

The system of FIG. 12, includes a microphone 1204 for converting an utterance 1202 into an electrical signal. Acoustic feature extraction is implemented on the signal from the microphone to form a set of features appropriate for modeling by latter stages of the system, 1206. The resulting features are used to compute the rank of each leaf of the acoustic context decision tree, 1210. The leaf ranks are used in computing the probability of each phoneme at each time frame, 1208. The matrix of probabilities of phonemes versus time triplets is computed, 1212, and used in the fast acoustic word match of the entire utterance, 1214, in accordance with the present invention. The acoustic score of each of the words resulting from the fast match is combined, 1216, with a language model score, 1218, for that word. In the embodiment described above, these words are in the matrix of contender words. The combined scores are sorted and the top N (typically 50) words are supplied to the detailed acoustic match process, 1220, which produces a hypothesized word sequence as the recognition output which is displayed and/or saved as the recognition word string 1222. The system is ready for a next utterance 1224.

An embodiment of the present invention employing the time-synchronous fast match algorithm was tested on a continuous speech recognition task. The vocabulary consisted of 20,000 words from the business news domain. The test data consisted of 5294 words uttered by 14 speakers. It was found that the technique of the present invention reduced the computation time of the fast match by approximately 88%, with an approximately 6% relative increase in the word error rate of the speech recognition system. Tabular results of error rates and time spent in the fast match computation (normalized to a 133 MHz processor) for individual speakers are shown in FIG. 13 when using a previous fast match decoding process. FIG. 14 shows the tabular results when using the fast match algorithm of this invention.

In one implementation the fast match process is performed in an iterative manner with an iteration performed for each of a plurality of frame triplets and each phoneme in the fast match graph is represented as a single state with a self loop.

Although the description is made for particular embodiments and arrangements, the intent and concept of the present invention are suitable and applicable to other embodiments and arrangements. For example, the fast match may be performed in its entirety either forwards or backwards in single frame steps rather than in triplets. The triplets concept may be implemented in a previous recognition procedure with alternating fast match and detailed match for utterance segments. It is thus clear to those skilled in the art that other modifications to the disclosed embodiments can be effected without departing from the spirit and scope of the invention.

What is claimed is:

1. A speech recognition method for recognizing an entire utterance, for a system including an asynchronous detailed match procedure, said method comprising the step of performing a synchronous fast match process for said entire utterance prior to executing said detailed match procedure.

2. A method as recited in claim 1, wherein said fast match process is performed in an iterative manner with an iteration performed for each of a plurality of frame triplets.

3. A method as recited in claim 2, wherein each phoneme in a fast match graph is represented as a single state with a self loop.

4. A method as recited in claim 1 wherein said fast match process proceeds backward from an end of said entire utterance towards a beginning of said entire utterance.

5. A method as recited in claim 1, further comprising: providing a fast match graph for a speech language vocabulary, wherein said fast match graph corresponds to a backward search, and wherein said graph has arcs having destinations exiting a given node and are stored as the successors to that node, while the sources of the incoming arcs are stored as its predecessors;

storing the phoneme identity of each node in said fast match graph for use in a Viterbi search;

storing an identity of each word formed by a group of phonemes; and invoking dynamic programming of said Viterbi search to enable construction of lists of potential words at each of said plurality of frame triplets.

6. A speech recognition system for recognizing an entire utterance and having means for receiving and executing a detailed match procedure, said system comprising:

means for performing a synchronous fast match on said entire utterance prior to asynchronously executing said detailed match procedure.

7. A system as recited in claim 6, wherein said fast match process is performed in an iterative manner with an iteration performed for each of a plurality of frame triplets.

8. A system as recited in claim 7, wherein each phoneme in a fast match graph is represented as a single state with a self loop.

9. A system as recited in claim 6, wherein said fast match process proceeds backward from an end of said entire utterance towards a beginning of said entire utterance.

10. A speech recognition method for recognizing an entire utterance segmented into a plurality of frames and based upon a speech language vocabulary, said method comprising:

receiving an utterance;

forming an acoustic signal of a plurality of phoneme constituents making up said utterance;

combining three of said frames to form a frame triplet;

initiating a fast match for said utterance by forming a phoneme probability matrix table giving probabilities of each phoneme versus an acoustic observation time, wherein said phoneme matrix table has each column corresponding to a single frame;

multiplying together a group of three individual probabilities of the three frames that make up each said triplet to produce a joint probability of the triplet for each particular said phoneme and triplet;

forming a triplet probability matrix representing a complete observation time of said utterance and having a row for each phoneme of said utterance and a column for each said triplet; and invoking a synchronous iterative process to perform the fast match for the entire utterance in steps of frame triplets.

11. A speech recognition method for recognizing an entire utterance segmented into a plurality of frames and based upon a speech language vocabulary, said method comprising:

receiving an utterance;

forming an acoustic signal of a plurality of phoneme constituents making up said utterance;

combining three of said frames to form a frame triplet;

initiating a fast match for said utterance by forming a phoneme probability matrix table giving probabilities of each phoneme versus an acoustic observation time, wherein said phoneme matrix table has each column corresponding to a single frame;

multiplying together a group of three individual probabilities of the three frames that make up each said triplet to produce a joint probability of the triplet for each particular said phoneme and triplet;

forming a triplet probability matrix representing a complete observation time of said utterance and having a row for each phoneme of said utterance and a column for each said triplet;

invoking a synchronous iterative process to perform the fast match for the entire utterance in steps of frame triplets;

initializing to the root node and to the end of the utterance;

determining for each potentially active node 'n' at a next time $\tau$, a maximum of a node at time $\tau+3$ which maximizes the product of a score of said node with the transition probability from said node into a potentially active node;

computing the score $s(\tau,n)$ of the potentially active node given by a product of said maximum and an observation probability at a current time of the phoneme identified with state 'n';

determining a maximum score of the node scores at the current time;

comparing the score for each potentially active node to said maximum score;

including in a next active list, only active nodes for which the difference between the log of said active node score and the log of the maximum score is less than a user-specified range constant; and adding to a matrix of contender words at an appropriate time, a new node placed in said next active list which corresponds to a beginning of a whole word, and a new node score of said new node.

12. A method as recited in claim 11, further comprising the step of making available said matrix of contender words to a detailed match process.

13. A method as recited in claim 11, wherein said new node score is obtained by multiplying an unnormalized backward score of said new node by an unnormalized forward score of a root node.

14. A method as recited in claim 13, wherein said unnormalized forward score of said root node is obtained from a detailed match procedure.

15. A speech recognition method for recognizing an entire utterance segmented into a plurality of frames and based upon a speech language vocabulary, said method comprising:

receiving an utterance;

forming an acoustic signal of a plurality of phoneme constituents making up said utterance;

combining three of said frames to form a frame triplet;

initiating a fast match for said utterance by forming a phoneme Probability matrix table giving probabilities of each phoneme versus an acoustic observation time, wherein said phoneme matrix table has each column corresponding to a single frame;

multiplying together a group of three individual probabilities of the three frames that make up each said triplet to produce a joint probability of the triplet for each particular said phoneme and triplet;

forming a triplet probability matrix representing a complete observation time of said utterance and having a row for each phoneme of said utterance and a column for each said triplet;

invoking a synchronous iterative process to Perform the fast match for the entire utterance in steps of frame triplets;

forming a 'next potentials list' from the 'current active list' if an utterance beginning has not been reached;

computing and storing a score for each node in the 'potentials list';

finding and storing a current highest node score;

choosing and using an inclusion range parameter to form the 'next active list';

entering and storing active list entries for each triplet in a 'matrix of contender words';

decrementing to a next backward frame triplet;

modifying the 'current active list' to correspond with the next active list; and stopping the fast match process if the utterance beginning has been reached.

16. A speech recognition method for recognizing an entire utterance, for a system including a fast match process and a detailed match procedure, wherein said fast match process proceeds backward from an end of said entire utterance towards a beginning of said entire utterance.

17. A speech recognition method comprising: recognizing an utterance by performing an asynchronous detailed match and a synchronous fast match, wherein said fast match is performed in an iterative manner with an iteration performed for each of a plurality of frames.

18. A method as recited in claim 17, further comprising representing each phoneme in a fast match graph as a single state with a self loop.

19. A method as recited in claim 17, further comprising forming said plurality of frames comprised of a frame triplet.

20. A speech recognition system for recognizing an utterance, said system comprising a fast match process which proceeds backward from an end of said utterance towards a beginning of said utterance.

21. A speech recognition system as recited in claim 20, including a fast match process, wherein said fast match process is performed in an iterative manner with an iteration performed for each of a plurality of frames.

22. A system as recited in claim 21, wherein each phoneme in a fast match graph is represented as a single state with a self loop.

23. A system as recited in claim 21, wherein said plurality of frames comprises a frame triplet.

24. A speech recognition apparatus comprising:

means for synchronously performing a fast match on an entire utterance; and means for executing a detailed match procedure asynchronously on said entire utterance so as to recognize said entire utterance.

25. A speech recognition apparatus as recited in claim 24, further comprising means for receiving said entire utterance.

26. A speech recognition method comprising:

multiplying phoneme probabilities together in groups of three frames, each group forming a triplet, and employing each triplet in a fast match process using a non-replicated one state model.

27. A speech recognition method as recited in claim 26, further comprising constructing a matrix of phoneme probabilities versus time triplets.

* * * * *